United States Patent [19]

Chevalet et al.

[11] Patent Number: 4,542,501

[45] Date of Patent: Sep. 17, 1985

[54] INTERFACE FOR MANAGING INFORMATION EXCHANGES ON A COMMUNICATIONS BUS

[75] Inventors: Jean Chevalet, Paris; Robert Reeves, Montigny, both of France

[73] Assignee: Centre National de la Recherche Scientifique, Paris, France

[21] Appl. No.: 554,048

[22] Filed: Nov. 21, 1983

[30] Foreign Application Priority Data

Nov. 25, 1982 [FR] France .................. 82 19780

[51] Int. Cl.$^4$ ............................................. H04J 3/02
[52] U.S. Cl. ..................................................... 370/85
[58] Field of Search ................. 370/85, 58; 340/825.1, 340/825.11, 825.12

[56] References Cited

U.S. PATENT DOCUMENTS

| 3,876,868 | 4/1975 | Cramwinckel et al. | 340/147 CN |
| 4,227,178 | 10/1980 | Gergaud et al. | 370/85 |
| 4,241,444 | 12/1980 | Kister | 370/85 |
| 4,292,623 | 9/1981 | Eswaran et al. | 370/85 |

FOREIGN PATENT DOCUMENTS

| 693694 | 3/1966 | Belgium . |
| 2232007 | 12/1974 | France . |
| 2365250 | 4/1978 | France . |
| 904334 | 8/1962 | United Kingdom . |

OTHER PUBLICATIONS

Patent Abstracts of Japan, vol. 6, No. 77, 5–14–1982, p. E–106955 and JP-A-5715549 (Matsushita Denki Sangyo K.K.).

Primary Examiner—Douglas W. Olms
Assistant Examiner—Frank M. Scutch, III
Attorney, Agent, or Firm—Michael N. Meller

[57] ABSTRACT

An interface for managing information exchanges on a communications bus between at least one control unit and peripheral units, or between said peripheral units.

The exchanged information includes data and a destination address of said data. The interface is characterized in that it comprises for each unit, data transmission circuitry connected to the unit and to the bus for managing the data transmission on the bus to the unit having the destination address, data reception circuitry connected to the units and to the bus, for managing the reception of data by the unit having the destination address, and management circuitry for managing the addressing of the units during exchanges and in particular for managing access priorities to the bus, without necessitating the intervention of the control unit.

This interface can be used for information exchanges between processing or measuring units.

20 Claims, 12 Drawing Figures

INTERFACE FOR MANAGING INFORMATION EXCHANGES ON A COMMUNICATIONS BUS

BACKGROUND OF THE INVENTION

The present invention relates to an interface for managing information exchanges on a communications bus between at least one control unit and peripheral units, or between said peripheral units.

The invention is applicable to the transfer of information between a control or processing unit and peripheral units, or between said peripheral units in real time, by means of an information exchange bus.

There are several real time levels:

the real time of the user or the true external time, which is linked with the performance of a process to be controlled and/or measured, the real time of information resulting from "simple" calculations, being linked with the performance of a program and consequently with the hardware structures of computers—it has inherent imprecisions, the real time involved in interfaces, which is synchronous with the external process and asynchronous with the computer and this real time must make the interface transparent to the actions of the computer.

The differences between these three notions of real time become more marked as the necessary time scale becomes short (all the problems being aggravated for a precision better than 1 millisecond).

The invention is more particularly applicable to the transfer of digital data between a control unit and peripheral units, by means of a bus, said peripheral units being e.g. constituted by equipment for measuring or controlling experimental or industrial processes.

It is known that there are numerous interfaces for the exchange information on a communications bus between a control unit and peripheral units, e.g. constituted by measuring equipment, or between said peripheral units. Thus, each designer of peripheral equipment or measuring equipment, supplies an interface enabling said measuring apparatus to be connected to a communications bus for exchanging information with a control unit, or with other peripheral units. With such interfaces, it is difficult to choose high-performance hardware, having reasonable operating and programming complexity at a reasonable cost.

Generally, the management interfaces for information exchanges on a communications bus between a control unit and peripheral units, require the use of a minicomputer or a microcomputer, making it possible to manage these exchanges, by means of logic circuits for connection to the communications bus. In general, the hardware and software structures used vary widely and each designer creates or modifies the interface and the management languages, as a function of the applications which he requires. The use of languages with high classical levels (such as Fortran) is exceptional and many interfaces are in fact similar to assembler-programmable automatons, which are difficult to modify for use in applications other than that initially provided.

The processing of data from a peripheral unit, such as e.g. a measuring apparatus, is never carried out in real time, when several peripheral units are connected to the same communications bus, unless an external synchronization device is provided.

Thus, existing interfaces are usually specific, relatively unsatisfactory for managing e.g. digital measurement results in real time and are difficult to adapt to a reasonable cost structure.

The known interfaces can be classified in three categories:

the interfaces oriented towards a scientific application (analytical, research and similar laboratories), modular interfaces making it possible to connect peripheral units to a specialized bus, the interfaces using the bus of a central processing unit.

The interfaces of the first category make it possible to automate the operation of a measuring apparatus, such as a spectrograph, an electrochemical measuring apparatus, a signal processing apparatus, etc.

All these interfaces are very specific and they have functions which are very precisely defined by the manufacturer. It is difficult, or even impossible to modify or adapt then to an even slightly different application. In general, the processor which manages the information exchanges across said interface cannot be used independently. This interface can have good performance levels for a particular application but, as has been indicated hereinbefore, has little flexibility.

Programmable automatons are included among the interfaces of this first category. These automatons are oriented even more towards certain industrial control functions, or may be completely allocated to a special task. They are also very difficult to modify, are relatively unadaptable to the measuring equipment of a research laboratory and often cannot be used in real time.

The modular interfaces of the second category permit data exchanges on a specialized bus and in reality constitutes a simple communications link between various points. For example, these interfaces can be as defined in standard IEEE 488. They permit parallel information communications between two autonomous information units. These interfaces are generally used in a modal system in which any communications pass through a master controller. The data transfer rate is relatively limited, although the programming of these transfers can be performed on the basis of well-developed languages.

In standards which define the interfaces of the second category, the problem of real time synchronization has not been solved. It is not possible to modify the interface, unless this is provided by the designer. These interfaces are very difficult to install on hardware for which the interfaces were not designed because they are defined by a standard.

Thus, the interfaces of the second category are very onerous, are not well adapted to industry and are very restrictive for their use in the laboratory. Thus, the interface defined by IEEE standard 488 is only a system for the interconnection of conventional instruments with a controller computer, particularly adapted to the transfer of large data blocks.

Another example of an interface of this category is defined in the CAMAC standard and is a far from new concept. It has a typical, but nodal modular structure and an excessively arborescent addressing. The software for managing it is therefore very heavy and requires large informatics hardware, the operating speed is only moderate and it is only possible to synchronize this interface in real time in an external manner. The management of interruptions and priorities is very complex, so that this interface is very costly, is little used in laboratories and in industry, although it is efficient for punctiform transfer.

The interfaces of the third category which use a bus connected to a master processor, are modular systems which can be connected to the bus of a microcomputer or minicomputer.

The interfaces of this third category are limited with regards to the possibilities of modification and/or extension. Their programming is very specific to each manufacturer and for each special application and it is not possible to use them in real time, without significantly changing the software or hardware structure provided by the manufacturer. This third category also includes modular interfaces based on specific "buses" (e.g. S100), which make them incompatible with one another. They are controlled by a microprocessor and their programming often takes place in an assembler. It is difficult or even impossible to adapt them to synchronous real time.

SUMMARY OF THE INVENTION

The object of the invention is to obviate these disadvantages and in particular to provide an interface for managing information exchanges on a communications bus between central processing units and peripheral units, or between said peripheral units. This interface is completely synchronous, operates in true real time and independently of the asynchronism of the central processing unit. Thus, this interface manages data exchanges on the bus in a synchronous and asynchronous manner with a known precision. It can be easily adapted to any type of central unit. Its applications are not specific and it can be programmed in any language (in particular high level, interactive, etc). Its modular structure facilitates its construction, as well as possible modifications and the removal of faults. This modular structure is evolutive and permits a simple addressing of peripheral units with an absolute security. The internal communications of this interface do not require the intervention of the master central unit and the operations carried out by it are independent of said central unit. It can permit the connection of several central units operating in real time, with e.g. the same measuring apparatus. Finally, it permits a very rapid data acquisition and control by means of local buffer stores.

The present invention specifically relates to an interface for the management of information exchanges on a communications bus between at least one control unit and peripheral units, or between said peripheral units designated by addresses, said information containing data transmitted by the control unit or at least one of the peripheral units, called the transmitting unit, and also containing a destination address corresponding to the central unit or the peripheral unit called the receiving unit, by which said data are to be received, wherein the control unit and each of the peripheral units respectively comprise (a) data transmission means having inputs which are respectively connected to the outputs of the control unit and the peripheral units, the outputs of said transmission means being respectively connected to the bus for managing the transmission of data to the unit having said destination address, (b) data reception means having inputs respectively connected to the bus, the outputs of said reception means being respectively connected to inputs of the control unit and peripheral units for managing the reception of data respectively by the control unit or by the peripheral unit having said destination address, and (c) management means connected to the transmission means, to the reception means and to the bus for managing the addressing of the various units during exchanges, for enabling the transmission of data on the bus to said destination address unit and for managing the reception of data by said unit, the access priority to the bus for the various units being variable and programmable in real time, each unit being able to exchange information with any other unit, without requiring the intervention of the control unit, and wherein the management means comprise scanning means for permanently applying signals to the bus for scanning the addresses of units able to transmit data to the bus and, for each of the units, means for comparison of the scanning addresses connected to the scanning means and respectively to the transmission means for comparing the address during scanning with the address of the unit having data to be transmitted to a predetermined address reception unit, said scanning address comparison means supplying to the transmission means corresponding to the transmission unit a signal LEN for enabling data to be sent to the bus during a time interval corresponding to the effective detection of said equality, the enabling signal LEN generating on the bus a signal LDAV for indicating the presence of data on the bus, and destination address comparison means connected to the bus and respectively to the reception means for comparing the destination address of the data transmitted on the bus with the address of each unit and for supplying on said bus a signal LDACC for the acceptance of the received data by the destination address unit, when an equality has been detected between the destination address of the transmitted data and the address of the reception unit.

According to another feature, the transmission means of each transmitting or receiving unit comprises (a) destination address transmission buffer register, which has inputs connected to the address outputs of the transmitting unit for recording the destination address of the receiving unit, the outputs of said address register being connected to the bus, and (b) a buffer register for the transmission of data to the receiving unit, the inputs of said data transmission buffer register being connected to the data outputs of the transmitting unit, and the outputs of said data transmission buffer register being connected to the bus, the signal LEN for the enabling of data transmission on the bus being supplied to the address and data transmission registers, said transmission being effective when the destination address comparison means of the receiving unit supply said data acceptance signal LDACC.

According to another feature, the reception means of each unit comprise (a) buffer register for the reception of data from another transmitting unit, said data reception buffer register having inputs connected to the bus for receiving data, the outputs of said data reception buffer register being connected to data inputs of the receiving unit corresponding thereto, and (b) an address reception buffer register having inputs connected to the bus and to the scanning means for receiving the address of the transmitting unit for said data, and inputs connected to the bus for receiving supplementary addressing information intended for the receiver and coming from the transmitter, the outputs of said address reception register being connected to inputs of the receiving unit, the data acceptance signal LDACC being supplied by reception address comparison means when the address comparison means of the transmitting unit has supplied the data transmission enabling signal LDAV.

According to another feature, the interface also has for each unit (a) logic transmission management means connected to the corresponding transmitting unit, said means supplying a signal TLOAD applied to the buffer registers of the transmitting unit, and a signal TDAV applied to an input of the transmission comparison means, and (b) logic reception management means connected to the corresponding receiving unit, said means supplying a signal RDY applied to a unit of the reception comparison means, if the corresponding receiving unit is ready to receive data, the reception comparison means being enabled by signal RDY, in the case of an equality with the destination address, to reply to the enabling signal LDAV, whilst carrying out, on the one hand, the loading of the reception registers, and on the other hand, by generating the data acceptance signal LDACC on the bus, and by indicating the reception of data to the reception management means, which respond by changing the logic state of the signal RDY, said signal immediately blocking the reception means and validating the outputs of the reception registers, by a validation signal ETR, the data acceptance signal LDACC generated in this way on the bus being applied to the transmission management means for restoring the latter to their initial state, whilst indicating to the transmitting unit the acceptance by the receiving unit of the data transferred.

According to another feature, the transmission address comparison means comprise, for each unit, an address comparator connected to the bus for receiving the address scanning signals from the scanning means, said comparator also being connected to the unit which is able to transmit data, for comparing the address of said unit with the scanned addresses, and a type D transmission flip-flop connected to an output of the transmission comparator, as well as to an output of the logic transmission management means supplying the signals TDAV, an output of said flip-flop supplying the bus with the transmission enabling signal LEN and the signal LDAV indicating the presence of data when an equality or identity is detected between the address of the transmitting unit and one of the addresses scanned by the scanning means, said transmission flip-flop being automatically restored to the non-transmission state after the signal representing the equality of the scanned address is no longer output by the address comparator.

According to another feature, the reception address comparison means of each unit comprise a reception comparator connected to the bus, for receiving the data destination address, said comparator also being connected to the corresponding reception unit for receiving the address of said unit, and to a type D reception flip-flop connected to an output of the comparator, to an output of the logic reception management means corresponding to said reception unit, this flip-flop also being connected to the bus, for receiving the signal LDAV for enabling data transmission on the bus, an output of this flip-flop supplying the data reception register with the signal RDAV for enabling the reception of data by said register, when the reception comparator detects an equality or identity between the address of the corresponding receiving unit and the data destination address supplied by the bus, when the flip-flop has received the signal LDAV for enabling the transmission of data, and when the logic reception management means have received the reception enabling signal RDAV and have supplied to the reception flip-flop a signal RDY indicating that the reception unit is ready to receive the data, said signal RDY being absolutely necessary for taking account of signal LDAV, the reception flip-flop being restored to the non-reception state after the signal representing the equality of the destination address and the address of the reception unit is no longer output by the reception comparator.

According to another feature, the address scanning means are non-reprogrammable means, which scan all or part of the addresses of the units in a predetermined order.

According to another feature, the address scanning means are programmable means, the number of scanned addresses being programmable and reprogrammable in real time.

According to another feature, the address scanning means and their priority level are retriggered by an interruption signal IRQ.

According to another feature, the scanning means are programmable for scanning the highest priority addresses, according to predetermined address values or according to predetermined succession sequences of these maximum priority addresses, the values of these addresses being independently reprogrammable in real time, said means being retriggered by an interruption signal IRQ.

According to another feature, the destination addresses are solely applied to the destination address comparison means of the receiving units, the address reception registers of said receiving units receiving, in place of said destination address, the scanning addresses which, for a given transfer, is the address of the data transmitter.

According to another feature, the lines of the bus are electrical transmission lines.

According to another feature, the lines of the bus are optical lines connected to optoelectronic couplers.

BRIEF DESCRIPTION OF THE DRAWINGS

The features and advantages of the invention can be gathered from the following description relative to the attached drawings, wherein.

DETAILED DESCRIPTION OF THE INVENTION

Figure 1:
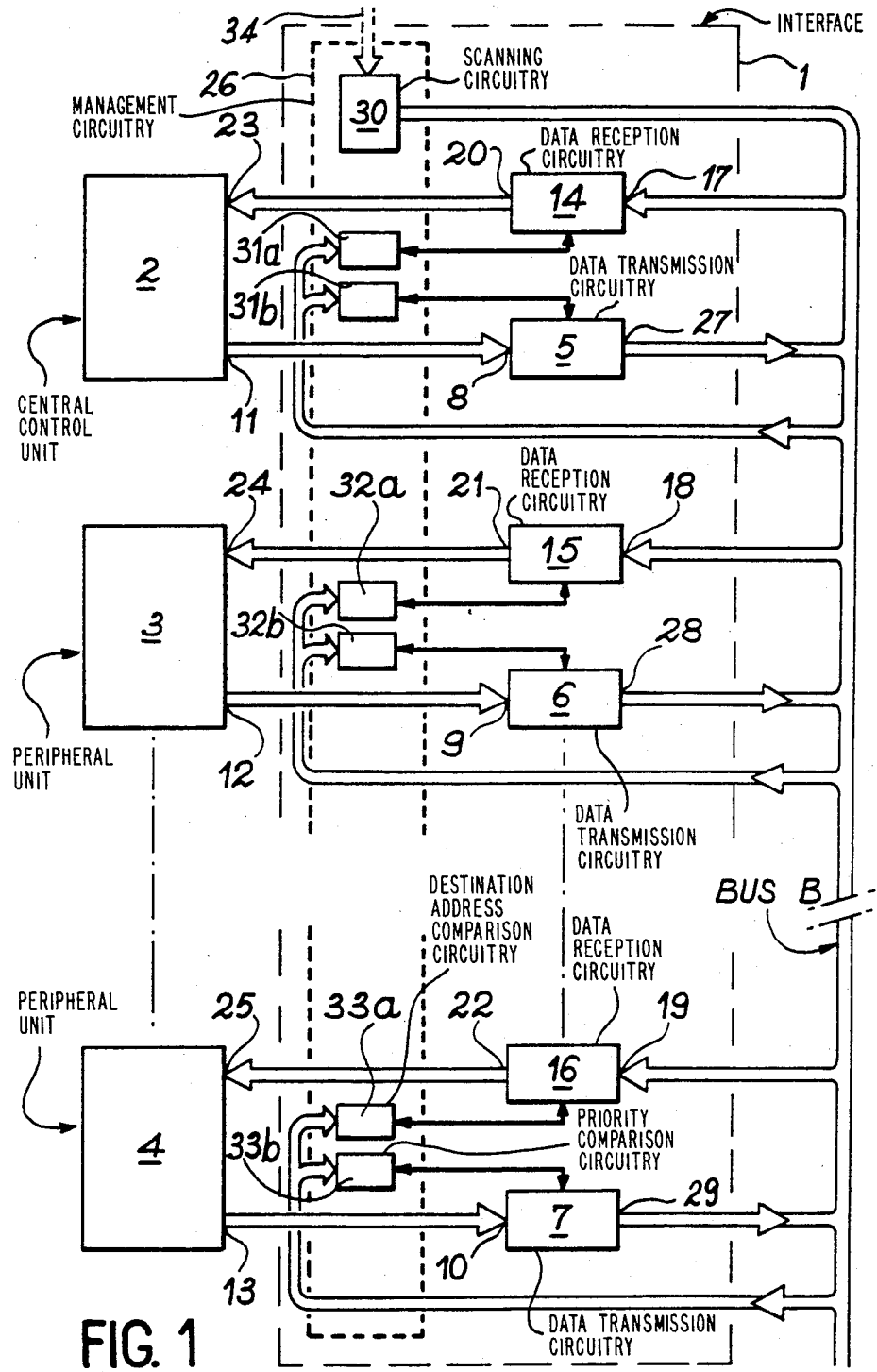
FIG. 1 shows diagrammatically an interface according to the invention, making it possible to manage information exchanges on a communications bus between a central processing unit and peripheral units, or between said peripheral units.

FIG. 1 diagrammatically shows an interface 1 for managing information exchanges on a communications bus B, between a central control unit 2 and peripheral units such as 3 and 4, or between said peripheral units designated by addresses, the number of these units having been limited to two in the drawing in order to simplify representation, but said number can obviously be much higher. The information contains data transmitted on bus B, either by central unit 2, or by one of the peripheral units 3, 4 and also contains the address of the peripheral unit by which the data must be received (destination address) by means of the communications bus.

For the central unit and for each of the peripheral units, the interface has means for transmitting data to bus B. These transmission means are shown at 5, 6 and 7 in the drawing and have respectively inputs 8, 9, 10, which are respectively connected to outputs 11, 12, 13 of central unit 2 and peripheral units 3, 4. Outputs 27, 28, 29 of these data transmission means are respectively connected to the bus for managing the transmission of data to the unit corresponding to the destination address. This interface also has means 14, 15, 16 for receiving data from bus B, said means having respectively inputs 17, 18, 19, which are respectively connected to bus B and outputs 20, 21, 22 respectively connected to inputs 23, 24, 25 of central unit 2 and peripheral units 3, 4. The reception means make it possible to manage the reception of data by the central unit or by one of the peripheral units, when the destination address has been effectively recognised, as will be shown hereinafter. Thus, the transmission and reception connections can coincide in the form of a bidirectional tristate connection. (Connections 17, 27 and 23, 11 are physically the same bidirectional tristate lines).

The connections such as 11, 8 and 20, 23 are physically realized on the same bidirectional tristate lines. As will be shown hereinafter (FIG. 8), the correct management of these bidirectional lines must be carried out under the control of transmitting or receiving units.

Finally, this interface comprises management means 26 (i.e. arbiter circuitry), connected to the data transmission means 5, 6, 7, to the reception means 14, 15, 16 and to the bus B. As will be shown in greater detail hereinafter, management means 26 make it possible to manage the priority levels of the central unit 2 and peripheral units 3, 4, in order to enable a data transmission on the bus to the destination unit, and for managing the reception of data by said destination unit. The priorities are fixed or programmable (programming inputs 34) and are allocated as a function of the addresses of the central and the peripheral units.

It is e.g. suitable to allocate an addresses 0 through 15 to the 16 units connected to the bus. It is also appropriate to allocate the maximum priority to address unit 0 and then, in decreasing order, to the following address units.

Management means 26 have means 30 for permanently applying to bus B the signals for scanning the priority levels (e.g. natural increasing order) respectively corresponding to the addresses of the central unit and the peripheral units. For central unit 2 and for each of the peripheral units, the management means also comprise means 31b, 32b, 33b for comparing priorities connected to the transmission means, for comparing the priority level of a unit able to transmit data to the destination unit with the priority levels successively scanned by means 30. Priority comparison means 31b, 32b, 33b supply the transmission means corresponding to the unit able to transmit data with a signal enabling the transmission of data to the bus, in the case of the detection of equality between the scanned level and the priority level of the unit in question. The management means 26 also comprise address comparison means 31a, 32a, 33a, respectively connected to the reception means 14, 15, 16 for comparing the destination address of the data present on the bus with the address of each unit 2, 3, 4. These address comparison means permit the reception of data by the predetermined address unit, when an equality or identity is detected between the destination address of the data present on the bus and the address of the destination unit.

Figure 2A:
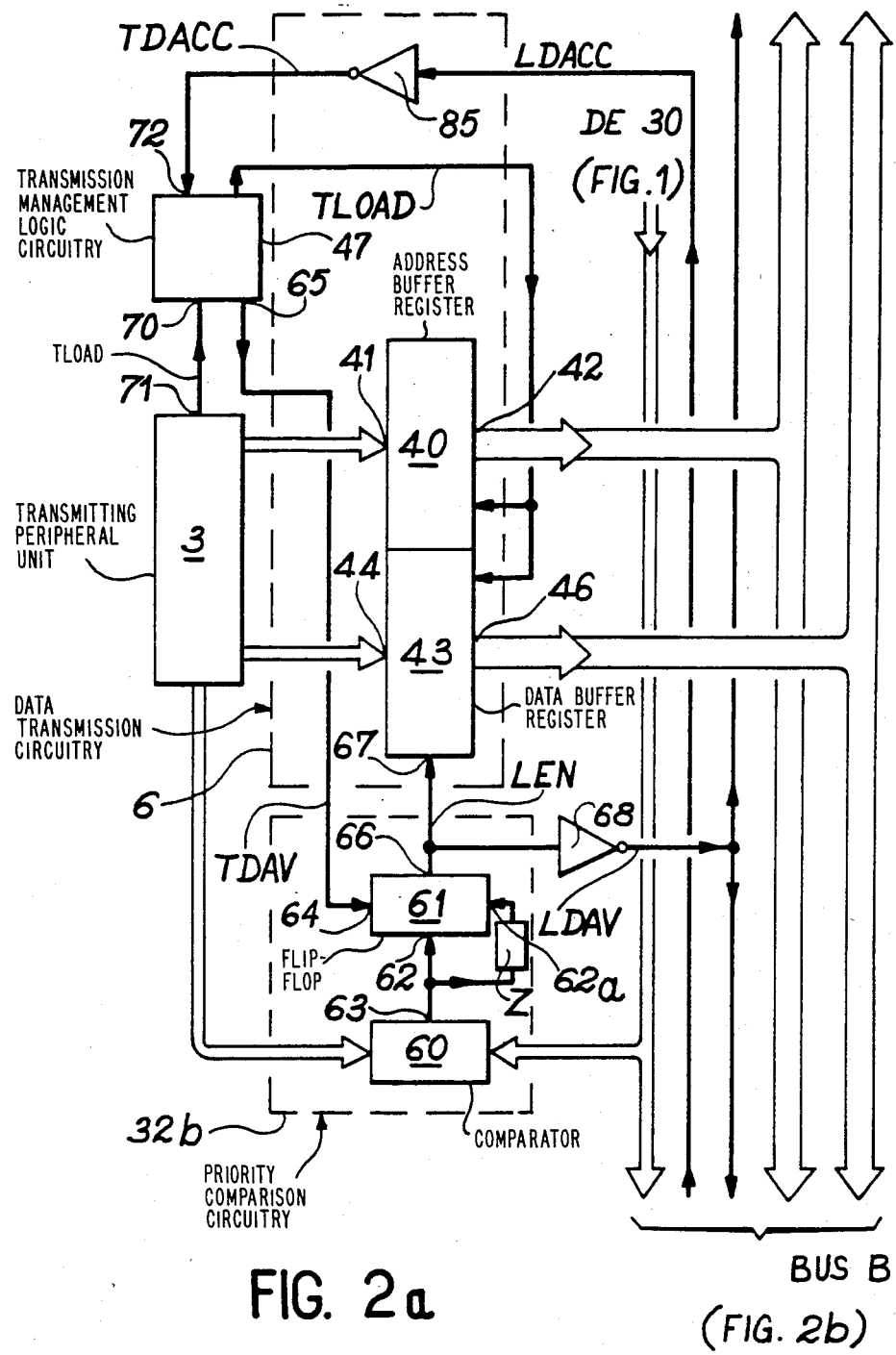
FIGS. 2a and 2b shows diagrammatically the transmission and reception means respectively, as well as certain of the priority management means belonging to said interface.
Figure 2B:
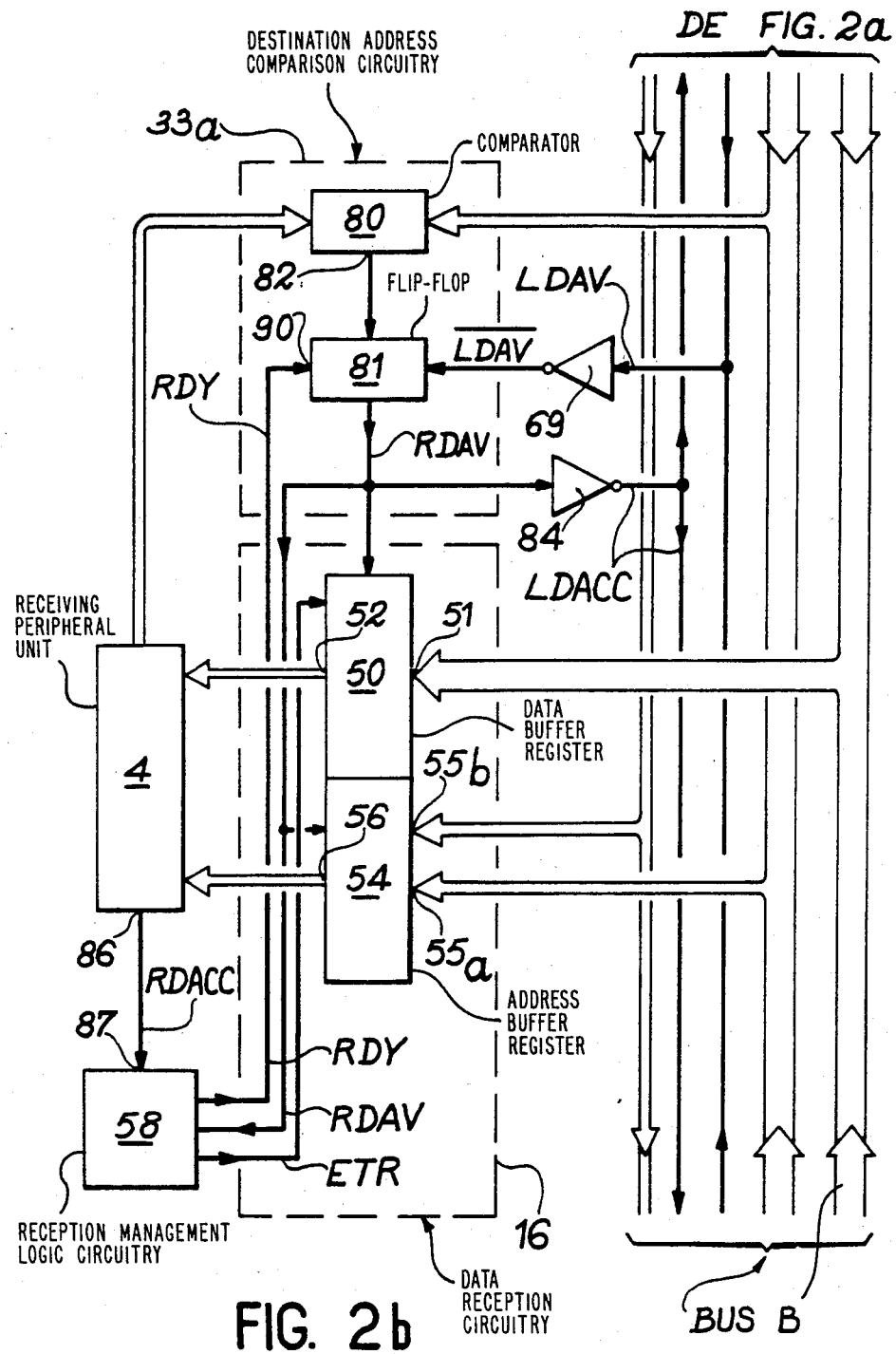

FIG. 2a diagrammatically shows e.g. one of the transmission means 6 of associated with unit 3, whilst FIG. 2b e.g. shows one of the reception means 16 associated with unit 4. It also diagrammatically shows the comparison means 32b for transmission and 33a for reception belonging to the management means 26 (FIG. 1) and associated with said units. It is obvious that these transmission and reception means, as well as the comparison means for these units, are respectively identical to those of the other units connected to the bus by the interface.

The transmission means 6 of unit 3 (which are identical with means 5, 7 of the other units) able to transmit data to another unit (e.g. unit 4), comprise a data destination address transmission buffer register 40 and a data transmission buffer register 43. The destination address buffer register 40 has inputs 41, which are connected to the address outputs of unit 3 able to transmit data to unit 4. Outputs 42 of register 40 are connected to bus B. The data buffer register 43 has inputs 44, which are connected to data outputs of unit 3. Outputs 46 of register 43 are connected to bus B. Transmission management logic means 47 associated with unit 3 (see FIGS. 7 and 8) are connected to transmission means 6 and make it possible to apply a signal $\overline{LDAV}$ to the transmission means 33a corresponding to the receiving unit 4. Thus, this signal indicates to all the receiving units that transmitting unit 3 has transmitted data on bus B. Receiving unit 4 is the only unit, following the identification of the destination address, to supply the data acceptance signal LDACC. Signal LDACC is then applied to the transmission management logic means 47. Signals $\overline{LDAV}$ and LDACC will be described in greater detail hereinafter.

The reception means 16 associated with unit 4 able to receive data (which are identical with the reception means 14, 15 of the other units) comprise a buffer register 50 for receiving data from the bus. This buffer register has inputs 51, which are connected to bus B for receiving data. Outputs 52 of this data reception buffer register 50 are connected to data inputs of receiving unit 4. The reception means 16 also comprise an address reception buffer register 54, which has inputs 55a connected to the address lines of bus B and 55b connected to the outputs of scanning means 30 containing the data source address. Outputs 56 of address register 54 are connected to inputs of receiving unit 4. The reception means 16 are connected to data reception management logic means 58 of unit 4 and said means make it possible to enable the reception of data from bus B, when the address comparison means 33a supply a signal representing equality and when the priority comparison means 32b corresponding to the transmitting unit 3 supply a data transmission enabling signal LEN.

The priority comparison means 31b, 32b, 33b comprise, for each unit, a logic transmission comparator 60, connected to bus B in order to receive the priority level scanning signals from scanning means 30 (FIG. 1). This comparator is also connected to the data transmitting unit 3, for comparing the priority level of said unit with each of the scanned levels. These comparison means also comprise a type D transmission flip-flop 61, an input 62 of which is connected to the equality output 63 of comparator 60. This flip-flop 61 functions in the following way. The signal representing the equality of identity of addresses received from output 63 brings about the immediate unlocking of the functions of flip-flop 61, which is normally locked. Then, following a time lag introduced by a circuit Z (minimum), the active rising front of the clock (input 62a) is brought about, which will take account of and transfer to output 66 the logic state of input 64 (TDAV). The end of the cycle (relocking) will be described in connection with the chronogram of FIG. 3. This flip-flop 61 also has an input 64, which is connected to an output 65 of the logic management means 47. An output 66 of flip-flop 61 is connected to a tristate controlled input 67 of the address and data registers 40, 43, in order to apply thereto a data transmission enabling signal LEN. Thus, and as will be shown in greater detail hereinafter, a signal LDAV is also applied to the comparison means 33a of the data reception unit 4, by means of bus B and two amplifiers 68, 69, which are used for technical reasons. When this signal is supplied to the comparison means 33a and when an equality is detected between the priority level of the transmitting unit 3 and one of the priority levels scanned by scanning means 30 and also when the logic management means 58 of the receiving unit indicates the availability (signal RDY) of the reception register, data transfer takes place by means of signal RDAV resulting from these three conditions. The same signal RDAV produces signal LDACC, which indicates to the transmitter that the transfer was successful.

Signal TDAV on output 65 of logic means 47 indicates the availability of the data contained in the data transmission register 43. A signal RDAV enables the reception of data and addresses by the reception registers 50, 54. This RDAV signal is the result of the action of signal LDAV and signal RDY (availability of the receiver) on a flip-flop 81 of means 33a. It is also applied to a control input of the logic management means 58 of reception unit 4, as well as to an inverting amplifier 84 which outputs the signal LDACC indicating the acceptance by reception unit 4 of data on the reception bus. This signal is applied to an input of an inverting amplifier 85 of the transmission means of transmitting unit 3 and is transformed into a signal TDACC. As will be shown in greater detail hereinafter, this signal controls the logic management means 47, in order that the latter will indicate to the transmission means that the transfer has been successfully completed.

FIGS. 2a and 2b also show the management signals actuated by the units (3 and 4 in the considered example). These signals are TLOAD, TDACC, TDAV, RDACC, RDY, RADV, ETR. The signal TLOAD supplied by an output 71 of transmitting unit 3 is, on the one hand, applied to a management input of management logic means 47 and, on the other hand, to a control input of registers 40, 43, so that the latter are loaded with the data and the address supplied by transmitting unit 3.

Signal RDACC is supplied by an output 86 of reception unit 4 and is applied to an input 87 of the reception management logic means 58. This signal indicates to these logic means that the reception unit 4 has received said data. Management means 58 transform this signal into a signal RDY, which is applied to an input 90 of flip-flop 81 of the reception comparison means 33a, to indicate that the reception unit 4 is again ready to receive data.

It should be noted that the connections between the elements of FIGS. 2a and 2b involve time lags, which will be explained hereinafter.

Data and addresses are transferred on the bus in the following way. The data lines between any transmitting unit and any receiving unit correspond in a biunivocal manner. The lines of the transmitting units containing the destination addresses only lead to the reception comparison means. However, the inputs of the reception registers corresponding to these lines are connected to the address scanning lines. These lines implicitly contain, during the data reception time, the address of the transmitting unit, i.e. the address of the source of the transmitted data. Thus, the useless transmission of the destination address to the reception unit is replaced by the transmission of the address of the source of said data, ensuring a total, unambiguous identification of any transfer.

FIG. 3 is a chronogram of the essential signals involved in the interface according to the invention. This chronogram will make it easier to understand the operation of this interface.

When one of the units, called the transmitting unit, such as e.g. peripheral unit 3, has data to transmit to another peripheral unit, such as e.g. unit 4, the signal TLOAD is applied to a control input of the address and data transmission buffer registers 40, 43 (FIG. 2), as well as to the input 70 of logic management means 47. For example, registers 40 and 43 are tristate buffer registers. The signal TLOAD makes it possible to drop signal TDAV, which was applied to input 64 of flip-flop 61 at a high logic level, to the low logic level. Signal TLOAD enables D flip-flop 61 to supply a high logic level signal LEN to output 66. A low logic level signal LDAV is then generated at the output of the inverting amplifier 68, when there is identity between the priority level of transmitting unit 3 and the priority level scanned by means 30.

The data and address which were registered in registers 40, 43 during the rise of signal TLOAD are then transmitted to the bus in response to signal LEN. This signal indicates to all the units of the data and destination addresses are available on the bus. The signal LDAV is applied to an input of the inverting amplifier 69. The output of said amplifier thus applies signal $\overline{\text{LDAV}}$ to an input of D flip-flop 81 of comparison means 33a associated with reception unit 4.

If, as in the considered example, unit 4 is the data receiving unit, address comparator 80 detects an equality between the destination address available on the bus (from registers 40 of the transmitting unit) and the address of said unit. On detecting the address equality in question, the type D flip-flop 81, which has received signal $\overline{\text{LDAV}}$ and which also receives from comparator 80 an equality detection signal, supplies at the output a signal- RDAV, if signal RDY of the reception management means 58 enables reception. This signal is applied to register 50 for registering the data available on the bus. The rise of signal RDAV enables the data transfer to register 50. This signal is also applied to a control input of logic means 58, for indicating thereto that the data have been transferred into register 50. These logic means control the reading of the register 50 by means of signal ETR.

Signal RDAV, which enables the reception of the data by register 50, is also applied to an input of inverting amplifier 84, whose output supplies the signal LDACC, indicating to the transmission means the acceptance of data by register 50 of the reception means 16 associated with unit 4. By means of bus B, signal LDACC is applied to an input of inverting amplifier 85. A signal TDACC is applied by the output of said amplifier to an input 72 of the logic control means 47 associated with transmitting unit 3 and this indicates data acceptance by reception unit 4, which constitutes the end of a transfer.

The end of the priority level scanning cycle by scanning means 30 resets the type D flip-flop 31 belonging to the comparison means 32b associated with transmitting unit 3. The end of address equality or identity brings about the relocking of flip-flop 61 by its input 62. Consequently, the outputs of the tristate registers 40, 43 for data and address transmission are then placed in the third state. Thus, output 66 of flip-flop 61 is an output $\overline{Q}$ of said flip-flop. The passage of the outputs of register 40, 43 into the third state releases bus B. Signal LDACC passes to a high logic level, because the validation of the registers is ended, leading to the disappearance of the destination address on the bus and consequently to the end of the equality signal on output 82 of the comparator 80 and consequently the resetting of flip-flop 81. The logic management means 47 of transmitting unit 3 detect the end of signal TDACC (passage to high logic level) and then pass signal TDAV to a high logic level, thus indicating the end of the transmission request by transmitting unit 3.

Signal RDAV which was at a high logic level passes to a low logic level at the end of the detection of equality of the priority levels by comparator 60 and prior to the arrival of the following address.

Figure 3A:
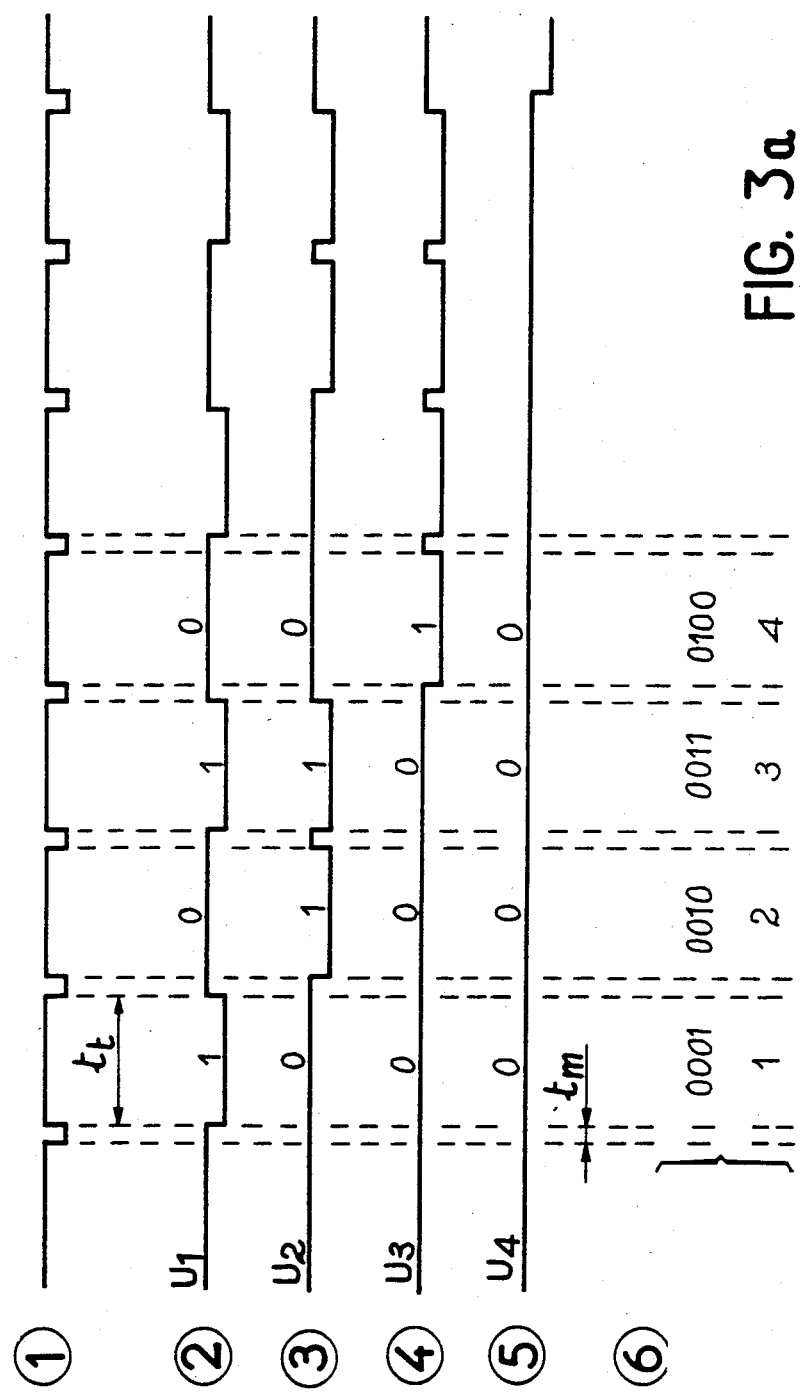
FIG. 3a is a chronogram corresponding to the scanning of the addresses of the units.
Figure 3B:
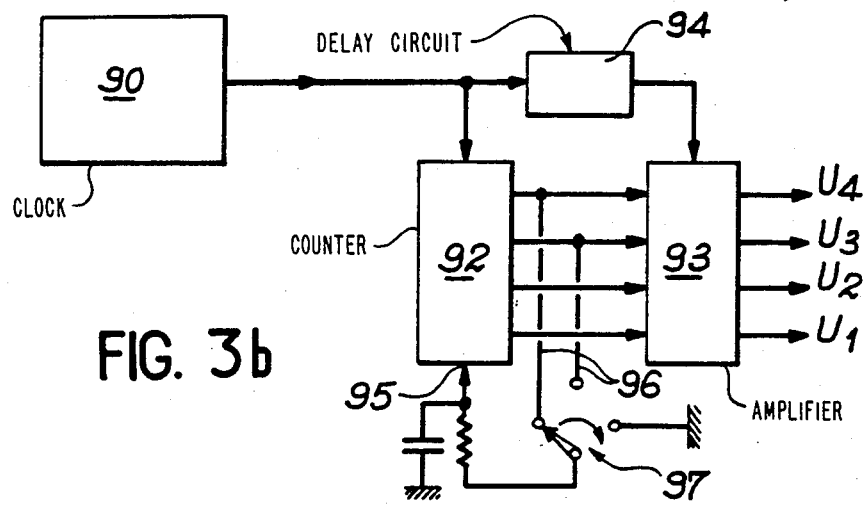
FIG. 3b shows diagrammatically a first embodiment of the means making it possible to permanently apply signals to the bus for scanning the priority levels of units connected to the bus.

FIG. 3a is a chronogram corresponding to the scanning of the addresses of the units. FIG. 3b diagrammatically shows a first embodiment of the means 30 which make it possible to permanently apply signals to the bus for scanning the priority levels of the units connected to the bus. A clock or oscillator 90 supplies the signal shown in line 1 of FIG. 3a. The asymmetry of the clock signal is defined by two times $t_t$ and $t_m$ (essential dead time). This clock increments a binary counter 92, whose outputs are connected to lines $U_1$, $U_2$, $U_3$, $U_4$ of the bus (scanning) by means of a tristate buffer amplifier 93 enabled by a delay circuit 94, which determines the time $t_m$.

In FIG. 3a, lines 2, 3, 4, 5 represent the states of outputs $U_1$ to $U_4$ of the amplifier 93. It is also possible to see in line 6 thereof, the address validating codes sent on the bus for the address in question. Thus, line 6 represents the chronology of the addresses (expressed in binary and decimal) enabled on the bus relative to clock 90 (line 1).

In this first embodiment, the means 30 are not reprogrammable. The address levels corresponding to the different units are scanned in order, which correspond e.g. to the natural order of these units.

In this embodiment, the scanning means are not triggered by an interruption signal from the bus and instead the address levels are permanently scanned on bus B in an invariable, cyclic order.

In the above-described embodiment of FIG. 3b, the scanning of the addresses normally takes place between 0 and 15, or depends on the counting capacity of binary counter 92. The resetting line 95 can be connected by switch 97 to one of the lines 96 or to ground (maximum excursion of the scan), which brings about a premature resetting of the counter, when one of these lines passes to a high logic level, thus realizing a limited, cyclic scanning of the addresses. The switch 97 can be controlled by real time programming with a view to optimizing the access speeds to the bus.

Thus, counter 92 can e.g. be a counter of type 74 93. Amplifier 93 is of type 8T 95 or 74 LS 365. The oscillator 90 comprises known means for supplying the signal of line 1 (FIG. 3a) in which the times $t_t$, $t_m$ and $t_t + t_m$ are adjustable, as will be shown hereinafter in the description of the optimization of the system.

Figure 4:
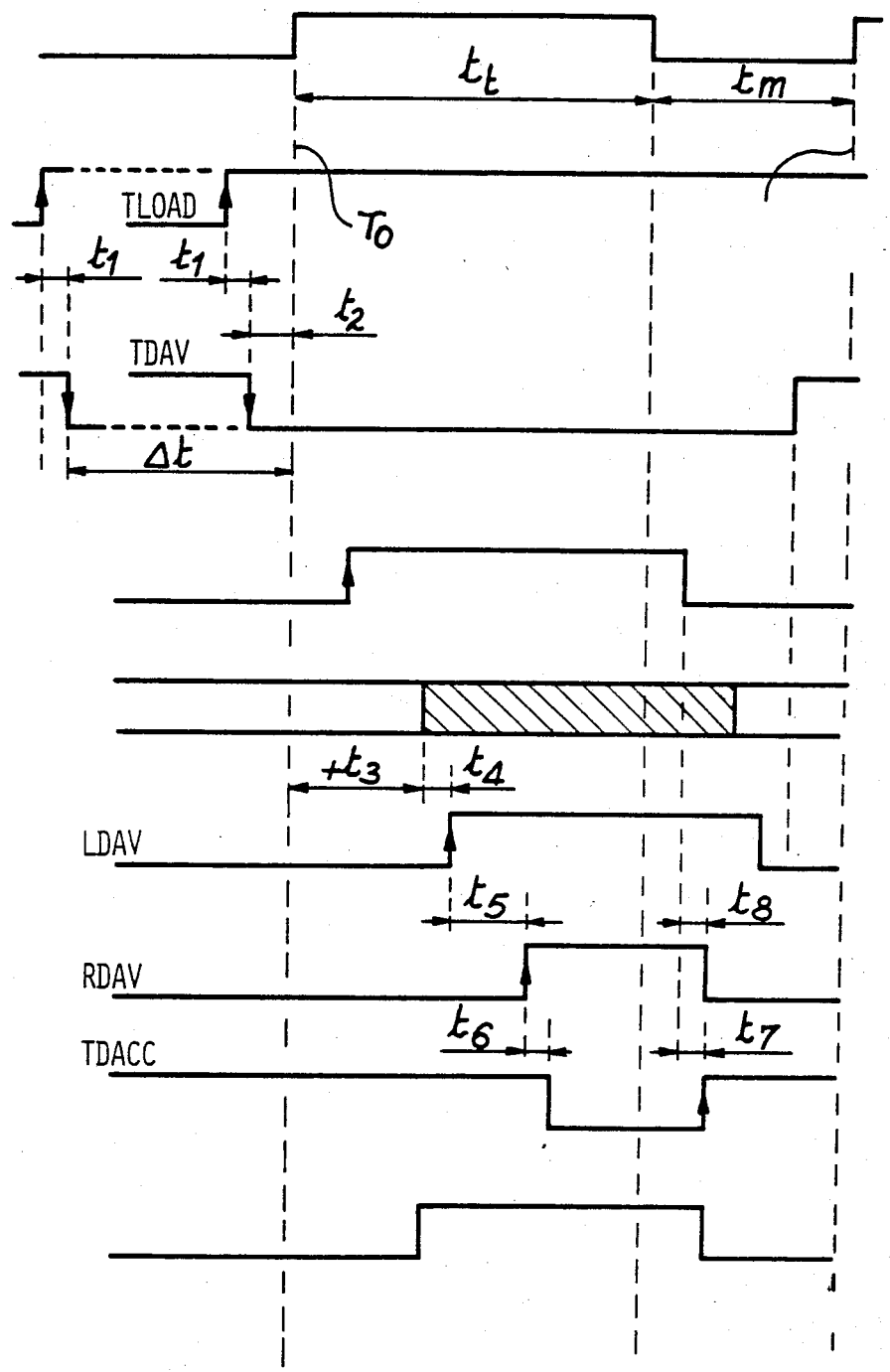
FIG. 4 is a chronogram of the essential signals occurring in the apparatus according to the invention.

FIG. 4 shows signals involved in the sequence of events based on a transfer request (TLOAD), from a given address unit. The signals shown in FIG. 4 occur over a period $t_t + t_m$ (FIG. 3a). Time lags $t_t$, $t_m$ and time $T_o$ have already been described. In FIG. 4, the time indication takes place from $T_o$.

The time lag $\Delta t$ is an arbitrary time interval separating a transfer request (TLOAD) and the time $T_o$ in which account is taken of this transfer by the address scanning means 30:

$t_1$: time lag $t_1$ corresponds to the time of enabling gates, not shown in FIG. 2, which give access to bus B;

$t_2 + t_3$: time lag $t_2$ corresponds to the time for putting in order flip-flop 61 of comparison means 32b, to which is added the time lag $t_3$ for the access of data to bus B;

$t_4$: this is a safety time lag added to signal LDAV and makes it possible to warn comparison means 33a associated with reception unit 4 that data have been transferred to the bus;

$t_5$: this time lag corresponds to the putting in order of flip-flop 81 of comparison means 33a associated with reception unit 4;

$t_6$: is a transmission time lag for signal TDACC to the logic management means 47 associated with transmitting unit 3;

$t_7$: is a time lag necessary for resetting in the third state of the registers for transmitting data to the bus;

$t_8$: is a time lag involved in the dropping again of the data reception enabling signal RDAV by register 50 of reception means 16 associated with reception unit 4.

In fact, these time lags are made necessary by the technology of the components used or are intended to ensure the transmission of data between a transmitting unit 3 and a receiving unit 4, under the best possible security conditions (inherent in the transfer).

The type D flip-flops 61, 81 belonging to the transmission and reception comparison means are flip-flops of series 74 LS, whilst comparators 60, 80 are of series 74 S 85.

Using the aforementioned components, the interface shown in FIG. 2 makes it possible to transfer data with a flow rate of 200 to 250 megabauds.

Using homogeneous components of type 74 S, this transmission speed can be increased to ~400/450 mbaud. The use of the latest TTL technology, such as 74 F (Fairchild) or AS, ALS (Texas), will make it possible to achieve transfer times $t_t + t_m$ of 30 ns, i.e. a transfer rate on the bus of approximately 1 gigabaud ($10^9$ bits/s). This would appear to be the limit speed of the system, bearing in mind the known electrical characteristics of a tristate bus (essentially capacitive problems).

The speed of the scanning means can be very easily optimized (by adjusting time lags $t_t$ and $t_m$). By adjusting the values of these time lags, such as using a simple management program for the transfer of data across all the units of the system, an attempt is made to test the values of the time lags ($t_t$ and $t_m$) below which errors suddenly appear. In normal operation, the frequency of the errors is negligible.

Figure 5:
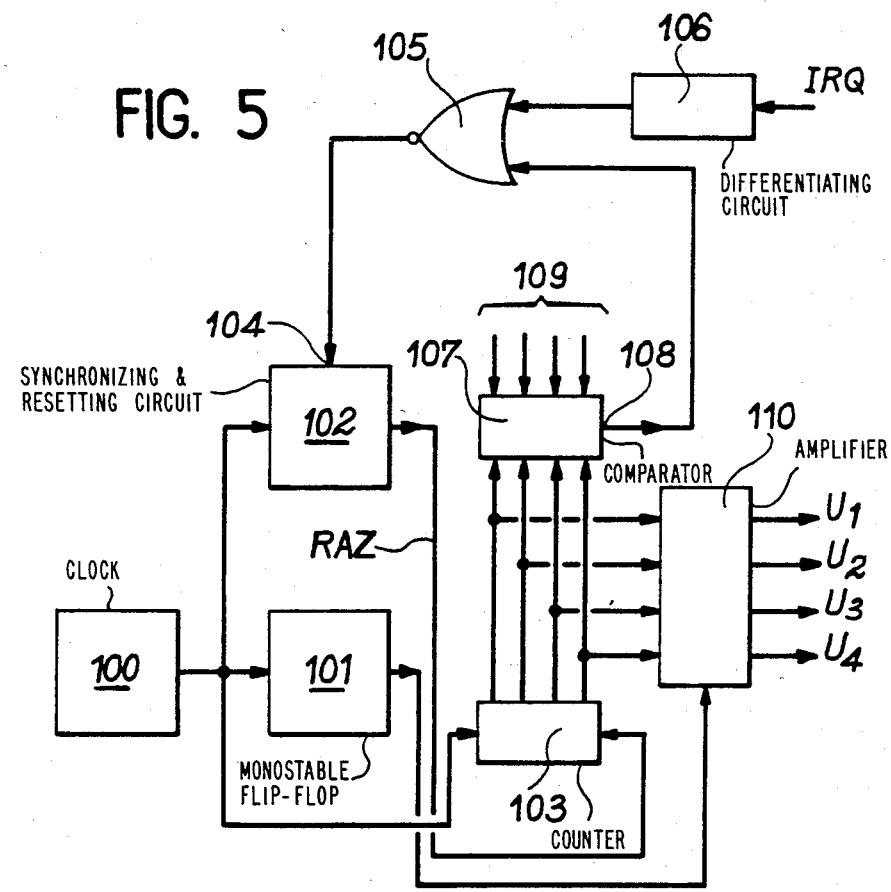
FIG. 5 shows diagrammatically a second embodiment of the means making it possible to apply signals for scanning the priority addressing levels to the bus.

FIG. 5 diagrammatically shows another embodiment of means 30 (FIG. 1) making it possible to apply scanning signals representing address priority to bus B. In this embodiment, the scanning means are like those of the first embodiment, but can also be intiated in response to an interruption IRQ from bus B, which in turn results e.g. from a request for access to the bus from one of the units 2, 3 or 4. This interruption IRQ brings about the restart of scanning from the highest priority address.

In this embodiment, the address scanning means comprise, an oscillator or clock 100, one output of which is connected, on the one hand, to a monostable flip-flop 101 and, on the other hand to a circuit 102 for the synchronization and automatic resetting (signal RAZ) of a counter 103 receiving pulses from oscillator 100. This automatic resetting and synchronization circuit can e.g. be constituted in per se known manner by type D flip-flops, which are not shown in this drawing. At an input 104, this circuit 102 receives output pulses from a NOR gate 105 having two inputs, one of the inputs of said gate receiving pulses from a differentiating circuit 106 and one input of the latter receiving an interruption signal IRQ, transmitted in response to a request from a transmitting unit. This signal is a short pulse. Another input of the NOR gate 105 is connected to an output 108 of a comparator 107.

When counter 103 has at its outputs, the binary value N previously loaded on inputs, 109 of comparator 107 (e.g. N between 1 and 15), the signal representing equality appears on output 108 and is transmitted to counter 103 by NOR gate 105 and synchronization circuit 102 (signal RAZ). The counter is reset and recommences the address scanning sequence. In the same way as in FIG. 3b, the tristate amplifier 110 transmits these addresses on lines $U_1$ to $U_4$ with the time lag $t_m$, controlled by the delay circuit 101.

If no interruption IRQ occurs, the address levels are scanned in natural progression on outputs $U_1$ to $U_4$ of register 110, in accordance with the chronogram of FIG. 3a. The scanning of these address levels consequently takes place in a cyclic manner between 0 and N. N can be set equal to the number of units connected to the bus and the choice of N will be explained hereinafter.

When an interruption IRQ is applied to the input of differentiating circuit 106, the counter 103, by means of the synchronization and resetting circuit 102, is reset and the scanning of the address levels starts at the highest priority level (address 0). This operating mode makes it possible to shorten scrutinization of the priority levels towards these lower priority levels.

In this embodiment, the tristate amplifier can be of type 8 T95 or 74 LS 365, whilst counter 103 can be of type 74 93 and comparator 107 can be of type 74 85.

Figure 6:
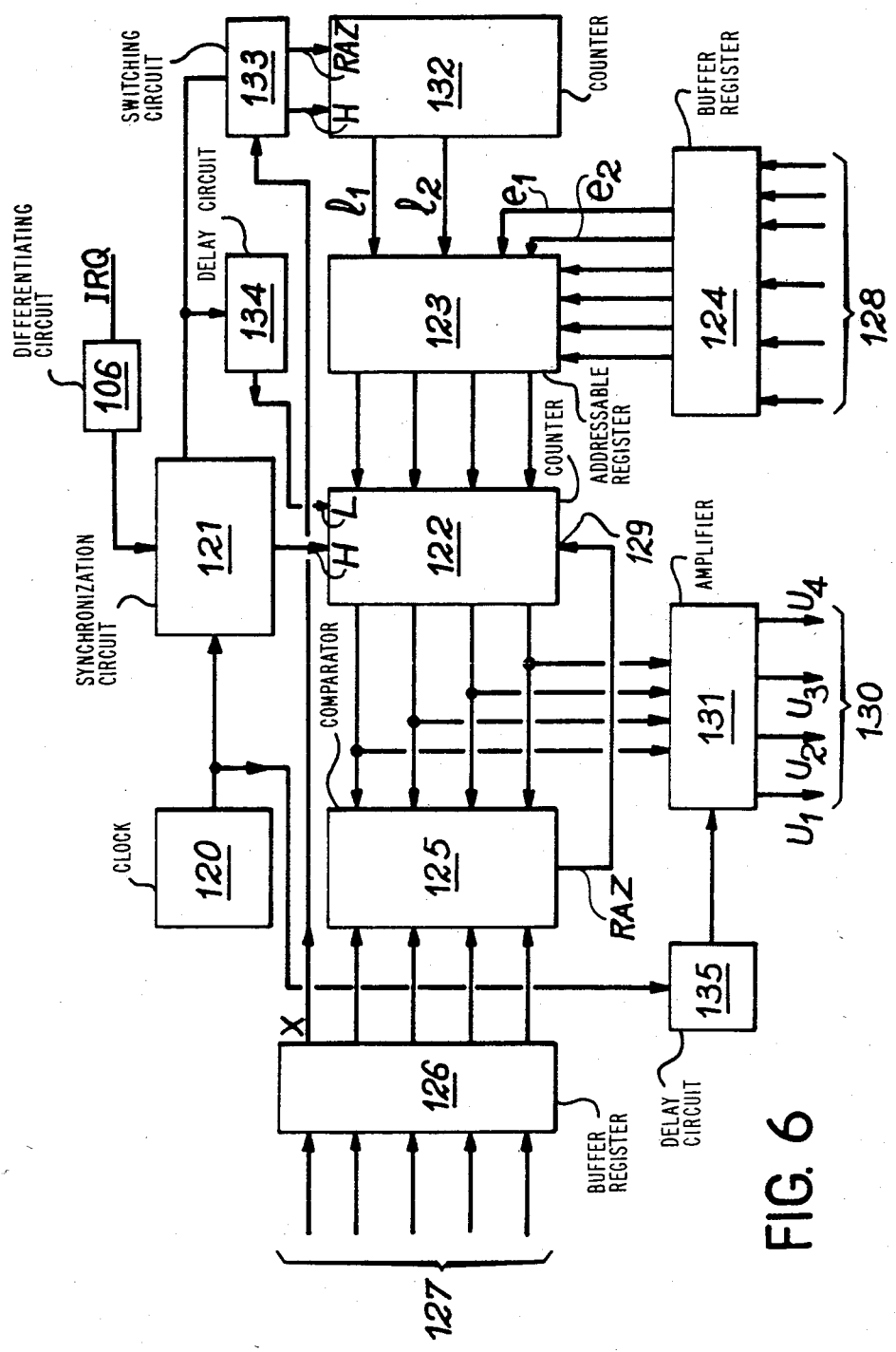
FIG. 6 shows diagrammatically a third embodiment of the means making it possible to apply the signals for scanning the priority addressing levels to the bus.

FIG. 6 diagrammatically shows another embodiment of the priority address level scanning means 30. In this embodiment, the scanning of the priority levels is programmable in several ways. The number of scanned levels can be programmed at any time either synchronously or asynchronously and a maximum priority linked with the arrival of interruptions can be allocated to a random level or successively to random level sequences, which are programmable in real time.

The operating principle is similar to that of FIG. 5, with additions making it possible to carry out the aforementioned functions. The scanning means comprise an oscillator or clock 120, an output of which is connected to the automatic synchronization circuit 121, constituted e.g. by type D flip-flops (not shown in the drawing), the outputs of circuit 121 being connected to the input H of the binary counter 122, which is synchronous and has parallel loading. The inputs of this counter are connected to outputs of an addressable register 123, which makes it possible to register, by means of another buffer register 124, predetermined sequences of maximum priority levels. These sequences are previously loaded by means of register 124. The outputs of counter 122 are connected to the inputs of a comparator 125 which receives, on its other inputs and from a buffer register 126, coded signals corresponding to the number of addresses N to be scanned. In fact, these signals come from coding signals applied to the inputs 127 of buffer register 126.

If no interruption IRQ occurs, counter 122 is regularly incremented by the clock input H and its binary output values appear on the four address scanning lines $U_1 \ldots U_4$, after passage into the tristate amplifier )31, enabled by a delay circuit 135 for stabilization purposes having a time delay $t_m$, controlled by clock 120. When the binary value on the outputs of counter 122 reaches the value loaded into register 126, the RAV signal representing equality is output by comparator 125. Which output signal at input 129 resets counter 122 and so on.

The arrival of an interruption signal IRQ at synchronization circuit 121, as a function of the state of the bit marked X of registers 126 and by means of the switching circuit 133 (demultiplexer), brings about either the resetting of counter 132, or its incrementation (input H) and then, following a stabilization time lag introduced by delay circuit 134, the forced asynchronous loading of counter 122 (by a line L), with binary values present at the outputs of register 123. The selection of the four values of four bits takes place by two reading addressing lines ($1_1$, $1_2$) of register 123, which are connected to the two low significance outputs of counter 132. Thus, the following applies as a function of the value of the X bit (operating mode control):

1st mode

The resetting (RAZ) of counter 132 takes place at each interruption and the value loaded at address 0 of the addressable register 123 is the maximum priority level forced at this time, on lines $U_1 \ldots U_4$, via counter 122. The following levels will be scanned in the natural order to the maximum. Value fixed at 126 (N). It is obviously possible to modify this value at any time by the loading of addressable register 123 by lines $1_1$, $1_2$ and the binary value from register 124.

2nd mode

At each interruption, counter 132 is incremented as is the reading address of register 123. The counter 122 is parallel loaded with a new value contained at this address. The succession of these values represents the predetermined succession of the maximum priority levels applied to the system for a given succession of interruptions. It is pointed out that the example of FIG. 6 gives a sequence of four successive values (register 123 of type 74 LS 670, for example), but this number is not limitative (several adequate addressing counters and circuits).

A variant consists of using a simple buffer register in place of register 123. At the desired time, this register will or will not be reloaded by the maximum priority level value required for the next interruption. At the output of circuit 121, signal IRQ then forces the parallel loading of said value in counter 122.

The special components which can be used in this embodiment, other than those already described, for the embodiment of FIG. 5, are selected in the following way counter 122 is of type 74 LS 161, addressable register 123 is of type 74 LS 170 or 74 LS 670, counter 132 is of type 74 LS 93, registers 124 and 126 are of type 74 LS 273, whilst multiplexer 133 is constructed on the basis of known gates.

With the embodiments of FIGS. 5 and 6, the user can control various optimization levels of the effectiveness of transfers, apart from the optimization of the aforementioned transfer time ($t_m + t_t$). By a careful choice of the addresses, in both FIGS. 5 and 6, the user can limit the cyclic scanning to the exact number of units present or, as desired, to a few higher priority units for a limited time. Moreover, in the embodiment of FIG. 6, the user can at any time redefine a maximum priority level other than level 0, in interruptable mode, or sequences of these maximum priority levels.

In the embodiments just described, an address scanning has been represented, which is controlled by four lines $U_1$ to $U_4$ enabling the addressing of only 16 separate units. This number is not limitative. However, any extension to a larger number of lines implies the choice of supplementary hardware, i.e. counters, comparators, registers, etc, which are adapted to this number, both for the scanning means 30, and the transmission and reception comparison means associated with each unit.

Figure 7B:
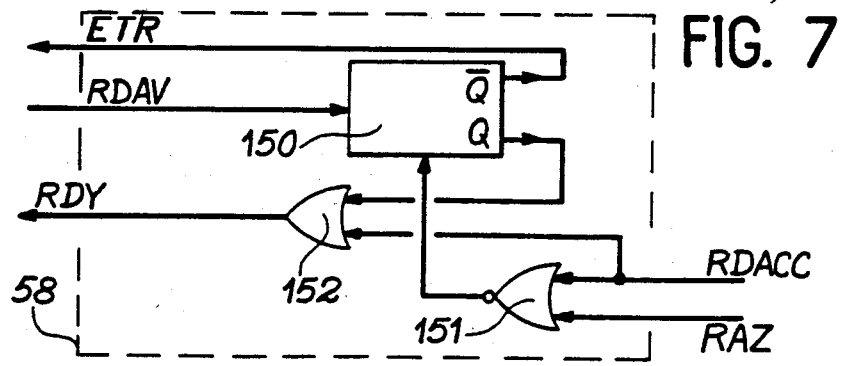
FIGS. 7a and 7b show an embodiment of the logic transmission (7a) and reception (7b) control means incorporated in the interface.
Figure 7A:
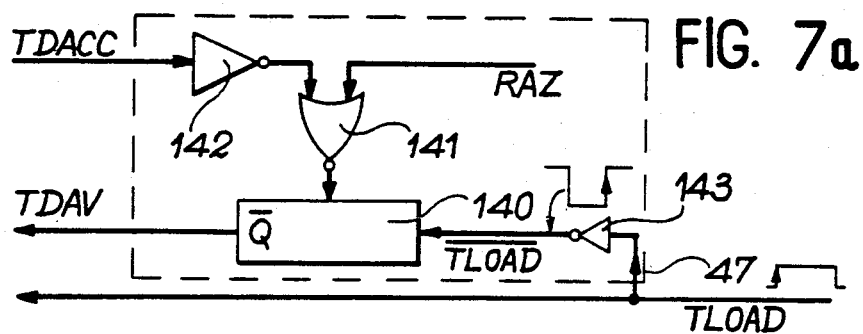

FIGS. 7a and 7b diagrammatically show the logic transmission management means 47 and the logic reception management means 58 for each unit connected to the interface in question.

FIGS. 7a diagrammatically shows the logic transmission control means, which comprise a type D flip-flop 140, which receives on one input the signal $\overline{\text{TLOAD}}$ across an inverting circuit 143. This signal indicates that the corresponding transmitting unit has data ready to be transmitted (registers 40, 43 in FIG. 2a). Another input of flip-flop 140 is connected to the output of a NOR gate 141, one input of which is connected to the output of an inverting amplifier 142. The input of inverting amplifier 142 receives signal TDACC, indicating that the receiving unit has received data. Another input of the NOR gate 141 can receive a resetting signal RAZ. The output $\overline{Q}$ of flip-flop 140 supplies signal TDAV, which is applied to the input 64 of flip-flop 61 (FIG. 2a) for indicating that the data can be transmitted to the bus, from the corresponding data transmission register.

FIG. 7b diagrammatically shows the logic reception control means 58, which comprise a type D flip-flop 150, which receives signal RDAV on one input. Another input of this flip-flop is connected to an output of a NOR gate 151, one input of which receives the signal RDACC. Another input of this gate can receive a resetting signal RAZ. Finally, the logic reception control means comprise an OR gate 152, one input of which receives signal RDACC and another input of which is connected to the output Q of flip-flop 150. The output of the OR gate 152 supplies signal RDY. The output $\overline{Q}$ of flip-flop 150 supplies a signal ETR, indicating that the reception unit is or is not ready to receive data.

Figure 8:
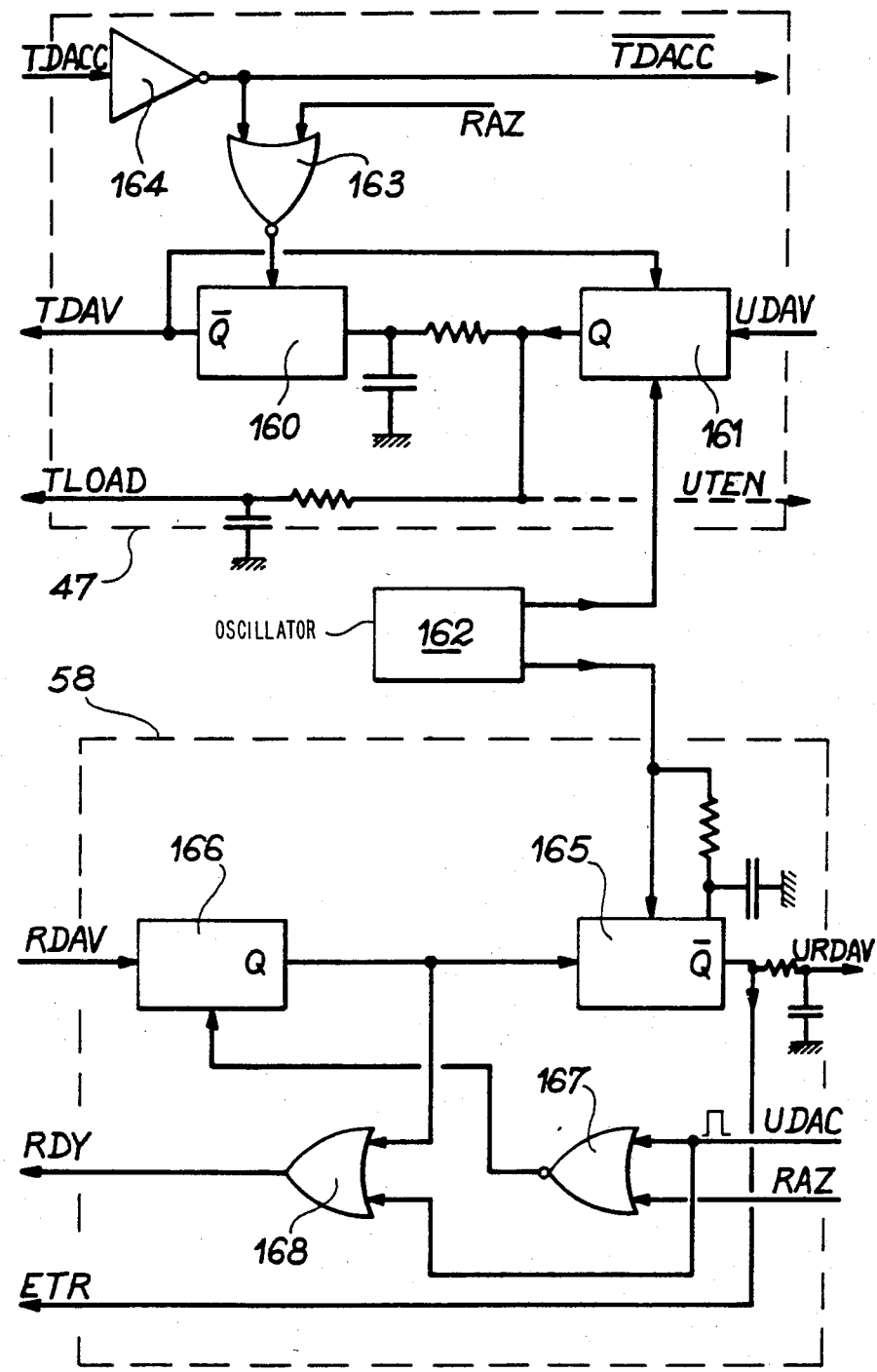
FIG. 8 shows the other embodiment for said logic transmission and reception control means.

FIG. 8 represents another embodiment of the logic transmission management means 47 and the logic reception management means 58, in the case where the user requires these two functions simultaneously.

The logic transmission management means 47 comprise two type D flip-flops 160, 161. Flip-flop 161 has an input connected to the output of an oscillator 162 and another input receiving a signal UDAV indicating that the transmitting unit is ready to transmit data. Output Q of flip-flop 161 supplies signal TLOAD across a delay circuit, as well as a signal UTEN, which is to be used by the user for validating the tristate outputs of these registers. This output Q connected to an input of flip-flop 160 by a delay circuit. Another input of flip-flop 160 is connected to the output of a NOR gate 163. One of the inputs of this NOR gate is connected to an output of an inverting amplifier 164. The input of this inverting amplifier receives signal TDACC. Another input of the NOR gate 163 can receive a resetting signal RAZ. Output $\overline{Q}$ of D flip-flop 160 is connected to a control input of flip-flop 161. This output $\overline{Q}$ supplies signal TDAV.

The logic reception management means 58 comprise two type D flip-flops 165, 166. A control input of flip-flop 165 is connected to an output of oscillator 162, whilst another input of flip-flop 165 is connected to an output Q of flip-flop 166. A control input of flip-flop 166 receives signal RDAV. These reception logic control means also comprise a NOR gate 167, one input of which receives a signal UDAC, which indicates to the management means that the receiving unit can again receive data. Another input of NOR gate 167 can receive a resetting signal RAZ. The output of NOR gate 167 is connected to a control input of flip-flop 166. Finally, the logic reception control means have an OR gate 168, one input of which is connected to the output Q of flip-flop 166 and another input of which receives signal UDAC. The output of OR gate 168 supplies signal RDY. Output $\overline{Q}$ of flip-flop 165 supplies signal ETR, which validates the output of data waiting in register 50 (FIG. 2b) and, after a stabilization delay, leads to signal URDAV intended for the final recording of data by the user.

Oscillator 162 is a symmetrical oscillator, which alternately enables the transmission of the reception operations. The oscillator frequency is regulated as a function of the user's needs and the technology of the components used.

Without giving them reference numerals, this drawing also shows the resistors and capacitors involved in known manner in the flip-flops and gates. The D flip-flops can e.g. be of type 74 LS 74.

Figure 9:
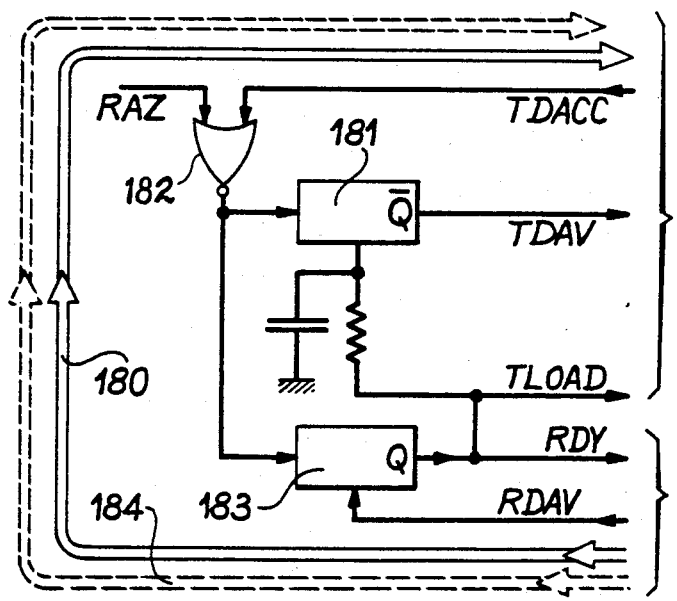
FIG. 9 shows means making it possible to apply test signals to the interface.

FIG. 9 diagrammatically shows the means making it possible to loop the test signals to the main means used in the interface and which corresponds to each unit connected to bus B. These test means are constituted in the following way. Lines 180 connect the outputs of the transmission address register to the inputs of the reception address register corresponding to the same unit. The test means also comprise a type D flip-flop 181 e.g. of series 74 LS 74. A control input of this flip-flop is connected to the output of a NOR gate 182. One input of NOR gate 182 can receive a resetting signal RAZ, whilst another input receives signal TDACC. An output $\overline{Q}$ of flip-flop 181 supplies signal TDAV, which is applied to the input 64 of flip-flop 61. Another output of flip-flop 181 supplies signal TLOAD, which is directly applied to the transmission registers 40, 43. These test means also comprise another type D flip-flop 183, one input of which is connected to the output of NOR gate 182. On an output Q, flip-flop 183 supplies signal RDY, which is applied to the input 90 of flip-flop 81. On another input, flip-flop 183 also receives signal RDAV indicating that the data have been received. These test means make it possible to check the transmission and reception means corresponding to the processing unit 20 or to each of the peripheral units.

If the data transmissions between the transmitting and/or receiving units and the interface are not of a bidirectional type (as has been assumed throughout the description), but are physically separate (transmission and reception) as shown in FIG. 1 (connections 11, 8 and 20, 23), it is necessary to provide in FIG. 9 the looping of the data received on the data transmitted (lines 184).

In the interface described hereinbefore, particular importance is attached to the priority allocation and address scanning means 30, which have a scanning speed regulatable from the oscillator. Thus, by means of a transmission - reception looping test, these test means make it possible to adjust the speed of the address scanning means, until it is possible to establish that there is no error in the data transmission. The interface described hereinbefore is designed in such a way as to permit the units which it controls to function in real time. All the means used by it are integratable. The scanning means are obviously common to all the units connected to the bus, no matter how many of such units are provided. They can be mounted on a card communicating with the controller, or can even be directly integrated into the physical structure of the bus.

A line (not shown) is provided with data information at the same time as the data is transmitted by the transmitting unit, which data information is received in synchronism with the data by the receiving unit. This line carries a bit conventionally indicating the length of the data blocks to be transferred and optionally the possibility of only carrying out a single reading. This leads to a supplementary optimization of the transfer speed.

Other bus lines (not shown) can be provided for carrying signals from a real time clock installed in a user unit through the interface. These signals permit a strict internal synchronization of all the user functions. This interface system functions as a non-nodal, synchronous, parallel processor.

The structure of the interface described can function both with bus lines in accordance with e.g. electrical TTL standards as described hereinbefore, and with e.g. optical lines able to fulfil the same functions. In particular, these optical lines must be bidirectional and function in accordance with a mode equivalent to the tristate or open collector mode. Obviously, they require the use of optoelectronic conversion means.

What is claimed is:

1. An interface arrangement for managing the exchange of information between units connected by a communications bus, said units including at least one control unit and a plurality of peripheral units, each of said units having a distinct address, any one of said units being capable of transmitting and receiving information comprising data and a destination address, said destination address corresponding to the address of the one of said units which receives transmitted information wherein said interface arrangement comprises:
   (a) a plurality of data reception means, each of said data reception means being connected to receive information from said communications bus and to transmit information to an associated one of said units;
   (b) a plurality of data transmission means, each of said data transmission means being connected to transmit information to said communications bus and to receive information from said associated one of said units;
   (c) scanning means for generating address signals in a predetermined sequence, said scanning means being connected to transmit said address signals to said communications bus, said address signals representing the addresses of said units and said predetermined sequence corresponding to the order of priority of said units for access to said communications bus by said units;
   (d) a plurality of priority comparison means, each of said priority comparison means being connected to receive said address signals from said communications bus and to transmit control signals to an associated one of said data transmission means; and
   (e) a plurality of destination address comparison means, each of said destination address comparison means being connected to receive destination address signals from said communications bus and to transmit control signals to an associated one of said data reception means,
   wherein each of said priority comparison means compares said address signals generated by said scanning means with signals representing the address of an associated unit and generates an equality signal in response to correspondence, each of said destination address comparison means compares destination address signals received from said communications bus with signals representing the address of an associated unit and generates an equality signal in response to correspondence, each of said priority comparison means in which said equality signal was not generated being disabled from transmitting a data transmission enabling signal to said associated data transmisssion means and each of said destination address comparison means in which said equality signal was not generated being disabled from transmitting a data reception enabling signal to said associated data reception means.

2. The interface arrangement as defined in claim 1, wherein said scanning means is adjustable and programmable.

3. The interface arrangement as defined in claim 1, wherein each of said priority comparison means is operatively connected to said bus whereby a signal indicating the transmission of data to said bus by said associated data transmission means is transmitted to said bus in response to the transmission of said data transmission enabling signal by said priority comparison means, and wherein each of said destination address comparison means is operatively connected to said bus whereby a signal indicating the reception of data from said bus by said associated data reception means is transmitted to said bus in response to the transmission of said data reception enabling signal by said destination address comparison means.

4. The interface arrangement as defined in claim 1, wherein each of said data transmission means comprises a data transmission buffer register and an address transmission buffer register, each of said transmission buffer registers being connected to transmit information to said bus and to receive information from said associated unit.

5. The interface arrangement as defined in claim 1, wherein each of said data reception means comprises a data reception buffer register and an address reception buffer register, each of said reception buffer registers being connnected to receive information from said bus and to transmit information to said associated unit.

6. The interface arrangement as defined in claim 1, further comprising a plurality of transmission management logic circuits, each of said transmission management logic circuits being connected to transmit a signal to an associated data transmission means for enabling the transmission of information from an associated unit to said associated data transmission means and to transmit a signal to an associated priority comparison means for indicating the transmission of said information to said associated data transmission means.

7. The interface arrangement as defined in claim 1, further comprising a plurality of reception management logic circuits, each of said reception management logic circuits being connected to transmit a signal to an associated destination address comparison means for indicating the readiness to receive information from an associated data reception means and to transmit a signal to said associated data reception means for enabling the transmission of information from said associated data reception means to an associated unit.

8. The interface arrangement as defined in claim 6, wherein each of said priority comparison means comprises an address comparator connected to said bus and to said associated unit for comparing said address signals generated by said scanning means with signals representing the address of said associated unit and outputting a signal representing equality in response to correspondence of said address signals, and a priority comparison logic circuit connected to receive said equality signal from said address comparator and said signal from an associated transmission management logic circuit for indicating the transmission of said information from said associated unit to said associated data transmission means, in response to which signals said priority comparison logic circuit outputs said data transmission enabling signal to said associated data transmission means.

9. The interface arrangement as defined in claim 7, wherein each of said destination address comparison means comprises an address comparator connected to said bus and to said associated unit for comparing said destination address signals generated by a unit different from said associated unit with signals representing the address of said associated unit and outputting a signal representing equality in response to correspondence of said address signals, and a destination address comparison logic circuit connected to receive said equality signal from said address comparator, said signal from said bus for indicating the transmission of data to said bus by said associated data transmission means, and said signal from an associated reception management logic circuit for indicating the reddiness to receive of said associated data reception means, in response to which signals said destination address comparison logic circuit outputs said data reception enabling signal to said associated data reception means.

10. The interface arrangement as defined in claim 8, wherein said priority comparison logic circuit comprises a D-type flip-flop.

11. The interface arrangement as defined in claim 9, wherein said destination address comparison logic circuit comprises a D-type flip-flop.

12. The interface arrangement as defined in claim 21, wherein said bus comprises a plurality of priority determination address lines, and said scanning means comprises a counting means connected to output said address signals to said plurality of priority determination address lines and a clocking means connected to output clocking signals to said counting means, wherein each of said predetermined sequence of address signals comprises a plurality of binary signals representing the increasing count carried out by said counting means.

13. The interface arrangement as defined in claim 12, wherein said scanning means further comprises a switching means, and said counting means has a plurality of output terminals for transmitting said binary signals and a reset terminal for receiving a reset signal, said switching means connecting said output terminals to said reset terminal such that said count is restarted in response to said count attaining a predetermined number, said predetermined number being adjustable by operation of said switching means.

14. The interface arrangement as defined in claim 12, wherein said scanning means further comprises a comparison means, and said counting means has a plurality of output terminals for transmitting said binary signals and a reset terminal for receiving a reset signal, said comparison means having a first plurality of input terminals for receiving binary signals representing a predetermined number, a second plurality of input terminals connected to said output terminals of said counting means, and an output terminal for outputting an equality signal in response to the equality of the binary signals received on said first and second pluralities of output terminals respectively, said output terminal of said comparison means being operatively connected to said reset terminal of said counting means such that said count is restarted in response to said count attaining said predetermined number, said predetermined number being adjustable.

15. The interface arrangement as defined in claim 14, wherein said reset terminal of said counting means is operatively connected to said bus such that said count is restarted in response to receipt of an interruption signal from said bus.

16. The interface arrangement as defined in claim 1, wherein said scanning means comprises interruption means connected to said bus such that the generation of said predetermined sequence of address signals is restarted in response to receipt of an interruption signal from said bus.

17. The interface arrangement as defined in claim 15, wherein said scanning means further comprises means for adjustably setting the number at which said count is restarted in response to said interruption signal.

18. The interface arrangement as defined in claim 5, wherein said address reception buffer register is connected to receive said address signals from said scanning means.

19. The interface arrangement as defined in claim 1, wherein said bus comprises a plurality of electrical conductors.

20. The interface arrangement as defined in claim 1, further comprising optoelectronic transducing means connecting said bus to said interface arrangement, wherein said bus comprises a plurality of optical transmission lines.

* * * * *